3,390,169
FORMATION OF DIELS-ALDER ADDUCTS BY CONTACTING A 1,3-DIENE WITH A MIXTURE OF AlCl₃, A HYDROCARBON SOLVENT, AND AN ACRYLIC ACID ESTER DIENOPHILE
Takashi Inukai, 577 Morimachi Isoku-ku, Kanagawa-ken, Japan, and Michio Kasai, 44 Otsutomocho, Kanagawa-ku, Yokohama-shi, Japan
No Drawing. Filed Mar. 22, 1966, Ser. No. 536,284
Claims priority, application Japan, Mar. 29, 1965, 40/18,185
6 Claims. (Cl. 260—468)

ABSTRACT OF THE DISCLOSURE

A method for producing a Diels-Alder adduct which comprises mixing from 0.01 to 1 mole of anhydrous aluminum chloride with one mole of a dienophile represented by a formula:

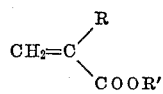

wherein R is H or $CH_3$ and R' is an alkyl radical having 1 to 20 carbon atoms, in a hydrocarbon solvent to form a complex dissolved in said solvent and then contacting an aliphatic or alicyclic 1,3-diene with the resulting preformed-complex-containing solution at a temperature of from room temperature to about 70° C. The above order of mixing of the reagents is essential for the complete avoidance of side reactions.

---

The present invention relates to a novel method of the production of the cyclic condensation products by the Diels-Alder type reaction. More particularly it relates to a method for producing cyclic condensation products from the reactions of esters of $\alpha,\beta$-unsaturated acids with 1,3-dienes in the presence of aluminum chloride as a catalyst.

As a chemical method which has some relationship with the preesnt invention, Robinson and Fray's method (U.S. Patent 3,067,244 and British Patent 835,840) may be referred to. According to said U.S. patent, the compounds of the formula, $CH_2=C(R)COR'$, wherein R=H or lower alkyl and R'=H, OH, or lower alkyl, are reacted with 1,3-dienes in the presence of the Friedel-Crafts catalysts, i.e., aluminum chloride, stannic chloride, titanium tetrachloride, zinc chloride, diethylaluminum chloride, ethylaluminum dichloride, or diethylaluminum chloride-titanium tetrachloride couple. Among the various possible combinations of the said reactants, the reaction of acrylic acid (R=H, R'=OH in the above formula) and butadiene with titanium tetrachloride catalyst (Example 3 of the U.S. patent mentioned above) was described to give only 44% yield of 3-tetrahydrobenzoic acid. Furthermore the purity of the product obtained according to the above-mentioned method was extremely low. Furthermore we found that the reaction of acrylic acid with butadiene in the presence of aluminum chloride, does not give any practical yield of the diene condensation product. In contradiction to the broad teachings of the reference, as shown by the above cited formula, the same authors stated that of the dienophiles which were studied in conjunction with butadiene, only acrolein, methyl vinyl ketone, and acrylic acid gave useful yields of the Diels-Alder adducts under the above-mentioned conditions (Fray and Robinson, J. Am. Chem. Soc. 83, 249 (1961)). It is, accordingly, an object of the present invention to provide a method for producing cyclic condensation product which affords such high yield as being commercially attractive.

According to the method of the present invention a dienophile compound represented by a formula of

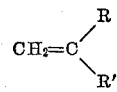

wherein R is a member selected from the group consisting of hydrogen and methyl radical and R' is a member selected from the group consisting of COOR" radical, wherein R" is a member selected from the group consisting of an alkyl radical having 1 to 20 carbon atoms is mixed with aluminum chloride in an organic solvent to form a complex dissolved in the said solvent, and a 1,3-diene is then allowed to come into contact with the preformed complex containing solution at a temperature of from room temperature to about 70° C.

The esters of acrylic acid, which escaped from Robinson and Fray's attention as the dienophile components, are selected in place of the free acrylic acids, and when aluminum chloride is used as catalyst, the reaction with dienes proceeds smoothly under mild conditions to give an excellent yield of the desired condensation products. Therefore it has been now concluded that, for obtaining the desired products in high yields, we must use the ester instead of the free carboxylic acids.

Further the order of addition of reactants is very important. To carry out the above-mentioned reaction effectively the dienophile is mixed with aluminum chloride in a suitable solvent to form a complex containing solution and the diene is then allowed to come into contact with the preformed complex containing solution, since undesirable side reactions always occur otherwise, for example, when butadiene is first passed into an aluminum-chloride-suspending-benzene, there occurs a Friedel-Crafts reaction between butadiene and benzene and a polymerization reaction of butadiene itself to form a muddy product.

Aluminum chloride does not dissolve in a solvent such as benzene and is rather suspended in it, while aluminum chloride dissolves in a solvent such as benzene in the presence of the dienophiles of the present invention to form a homogeneous solution containing complex, because the complex dissolves in the solvent. The resulting complex in the solution is a very suitable catalyst for the present invention.

One feature of the present invention consists in the specific usefulness of aluminum chloride as the catalyst: the so-called Friedel-Crafts catalysts are not generally useful as catalysts of reactions of the present invention. Thus, for example, $BF_3$ etherate, stannic chloride, ferric chloride, its hydrate, titanium tetrachloride etc. are of much less or practically no activity, or give rise to substantial formation of undesirable by-products. Therefore their use in commercial operation is undoubtedly inappropriate. Aluminum chloride only can be used to achieve the object of the present invention. Another feature of the present invention is that even those conjugated dienes such as 2,3-dimethylbutadiene and cyclopentadiene, which are very apt to polymerize in the presence of the Friedel-Crafts catalyst, give the desired products in high yields, without forming undesirable polymeric by-products. To our present knowledge, only the $\alpha,\beta$-unsaturated carboxylic esters react with the dienes in excellent yields with complete suppression of resin formation in the presence of the Friedel-Crafts catalysts. The reactions using other types of dienophile components are inevitably accompanied wtih undesirable resin formation which lowers the yield of the Diels-Alder adducts. For example, according to Fray and Robinson (loc. cit.), the attempted reaction of methyl vinyl ketone with 2,3-dimethylbutadiene or with cyclopentadiene catalyzed by titanium tetrachloride yielded no Diels-Alder adduct, but gave only dimer and polymers of the diolefin.

In the α,β-unsaturated compounds represented by the above-mentioned formula, R″ is alkyl group of carbon numbers from 1 to 20, preferably linked to the carboxylic oxygen atom with primary carbon. Illustrative compounds include from lower alkyl acrylate or methacrylate such as methyl acrylate, methyl methacrylate, to higher alkyl acrylate or methacrylate such as octadecyl acrylate, octadecyl methacrylate, etc. Examples of 1,3-dienes which can be used include: 1,3-butadiene, isoprene, piperylene, 2,3-dimethyl butadiene, chloroprene and cyclopentadiene etc.

The general procedure of the present invention is that the above α,β-unsaturated carboxylic esters are mixed with aluminum chloride in an organic solvent, which is substantially inert under the conditions of the reaction, like aromatic hydrocarbons such as benzene, toluene, xylene etc., paraffinic hydrocarbons such as hexane, octane, ligroin, etc., to form a homogeneous solution containing complex, and then allowed to come into contact with the 1,3-dienes at generally from room temperatures to about 70° C., for generally a few hours or less depending on the reactivity of the components, with stirring. The reaction can of course be carried out under normal pressure as well as under pressure as required by the physical properties of the reactants. The mole ratio of the α,β-unsaturated compound to the diene is not material. The amount of the catalyst used can be varied depending on the kind of the reactants and reaction conditions, but 0.01 to 1 mole of aluminum chloride per 1 mole of α,β-unsaturated carboxylic derivatives is generally preferred. After the reaction is substantially over, dilute mineral acid like hydrochloric acid is added to the reaction mixture, and the latter is washed with water, dried, and is subjected to distillation to obtain the product.

The products have uses as the intermediates to epoxides and others.

The following examples, together with controls, are given to illustrate the present invention without limiting its scope. Percents by weight are used throughout.

EXAMPLE 1

To a stirred suspension of 6.8 g. of powdered anhydrous aluminum chloride and 250 ml. of benzene warmed to about 50° C. was added a solution of 43.2 g. of methyl acrylate in 50 ml. of benzene in 10 min. Aluminum chloride rapidly dissolved to form a slightly yellow clear solution. 35 l. of butadiene was bubbled through the solution with stirring during 4 hrs., the temperature of the mixture being kept at 50–60° C. by external heating. The resulting solution was cooled and treated with dilute hydrochloric acid to decompose the catalyst. The benzene layer was washed with water and dried over anhydrous sodium sulfate. The benzene was removed by distillation at atmospheric pressure and the residue was distilled to obtain 64 g. (92% based on methyl acrylate) of methyl $\Delta^3$-tetrahydrobenzoate, B.P. 73.0–73.5° C. at 20 mm. Hg.

Control 1

Into a mixture of 220 ml. of benzene, 25.9 g. of methyl acrylate and 5.8 g. of titanium tetrachloride was bubbled 17 l. of butadiene at 50–60° C. The yield of $\Delta^3$-tetrahydrobenzoate was 19% (8.2 g.). The reason for the low yield is due to the low catalytic activity of titanium chloride because the formation of resinous material was negligible.

EXAMPLE 2

Proceeding in the same manner as in Example 1, but using the same amount of hexane in place of benzene, 73% yield of methyl $\Delta^3$-tetrahydrobenzoate was obtained.

EXAMPLE 3

To a stirred suspension of 4.3 g. of aluminum chloride and 250 ml. of benzene was added 26.1 g. of methyl acrylate in 30 ml. of benzene during 15 min. 20.9 g. of gaseous isoprene was introduced into the resulting solution in 0.5 hr. and the mixture allowed to stand for an additional 3 hrs. at 20° C. 47 g. (59% based on acrylate) of methyl $\Delta^3$-tetrahydrotoluate, B.P. 90–92° C. at 20 mm. Hg, were obtained.

EXAMPLE 4

To a stirred suspension of 10 g. of aluminum chloride and 150 ml. of benzene was added 126 g. of methyl acrylate. To the resulting solution was added 100 g. of piperylene on the water bath at about 70° C., in 0.5 hr. After the addition, the temperature of the mixture was kept at about 70° C. with stirring. The resulting solution was treated as in Example 1. 192 g. of Diels-Alder adducts was obtained. Yield, 85%, B.P. 103–105° C./40 mm. Hg. After purification of the adducts, about 90% of the adducts purified was methyl cis-2-methyl-$\Delta^3$-tetrahydrobenzoate, and the remainder was methyl trans-2-methyl-$\Delta^3$-tetrahydrobenzoate, methyl 5-methyl-$\Delta^3$-tetrahydrobenzoate, etc.

EXAMPLE 5

To a stirred suspension of 6.3 g. of aluminum chloride and 150 ml. of benzene was added 15.9 g. of methyl acrylate. To the resulaing solution was added 16.4 g. of chloroprene on the water bath at about 70° C. after the addition, the temperature of the mixture was kept at about 70° C. for 3 hrs. 21 g. of methyl $\Delta^3$-tetrahydrochlorobenzoates (comprising ortho- and meta-compounds) was obtained. Yield, 65%, B.P. 95° C./12 mm. Hg.

EXAMPLE 6

To 280 ml. of benzene were added 32.4 g. of octadecyl acrylate and 5 g. of aluminum chloride. Into the resulting solution was passed 15 l. of butadiene at about 60° C., for 5 hrs. 26.8 g. of octadecyl $\Delta^3$-tetrahydrobenzoate was obtained, yield: 71%.

EXAMPLE 7

Into a mixture solution of 280 ml. of benzene, 30.3 g. of methyl methacrylate and 4.6 g. of aluminum chloride was bubbled 15 l. of butadiene at 50–60° C. and the mixture was treated in the usual way to yield 27 g. of methyl 1-methyl-$\Delta^3$-cyclohexene carboxylate. Yield: 60% (based on methyl methacrylate).

EXAMPLE 8

To a mixture of 160 ml. of benzene, 41.2 g. of methyl acrylate and 6.3 g. of aluminum chloride was added a solution of 30 g. of cyclopentadiene in 300 ml. of benzene, at room temperature, in 15 mins., and the resulting mixture was stirred for 3 hrs. 70 g. of methyl 5-norbornene-carboxylate, B.P. 86–88° C./12 mm. Hg, was obtained; yield: 85% (based on cyclopentadiene). The dimer or polymers of cyclopentadiene were not formed.

EXAMPLE 9

To a mixture of 280 ml. of benzene, 15.9 g. of methyl acrylate and 2.5 g. of aluminum chloride was added a solution of 15.1 g. of 2,3-dimethyl butadiene in 30 ml. of benzene at room temperature and the mixture stirred for 5 hrs. and was treated in the usual way 23 g. of methyl 3,4-dimethyl-$\Delta^3$-cyclohexene carboxylate, B.P. 104–106° C./20 mm. Hg, was obtained. Yield: 74% (based on the diene).

Control 2

5.4 l. of butadiene was bubbled into a stirred mixture of 2.7 g. of titanium tetrachloride and 90 ml. of benzene. A solution of 5.1 g. acrylic acid in 10 m. of benzene was then added at 20° C. to the above solution. After stirring for one hour, water was added, and the benzene layer was washed with water, dried over anhydrous sodium sulfate, and was distilled. The distillate was fractionated in two fractions; (i), B.P. 60–120° C. at 19 mm. Hg, 1.4 g., and (ii), B.P. 120–128° C. at 19 mm. Hg, 1.4 g. The fractions (i) and (ii) contained 20% and 88% of $\Delta^3$-tetrahydrobenzoic acid (by gas chromatography), respectively. Total yield of Δ³-tetrahydrobenzoic acid is calculated to be 17% of the theoretical.

What is claimed is:

1. A method for producing a Diels-Alder adduct which comprises mixing from 0.01 to 1 mole of anhydrous aluminum chloride catalyst with one mole of a dienophile represented by a formula

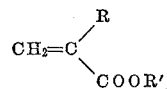

wherein R is H or CH₃ and R' is an alkyl radical having 1 to 20 carbon atoms, in a hydrocarbon solvent to form a complex dissolved in said solvent and then contacting an aliphatic or alicyclic 1,3-diene with the resulting preformed-complex-containing solution at a temperature of from room temperature to 70° C.

2. A method according to claim 1, wherein 1,3-diene is 1,3-butadiene.

3. A method according to claim 1, wherein 1,3-diene is isoprene.

4. A method according to claim 1, wherein 1,3-diene is a member selected from the group consisting of piperylene and 2,3-dimethyl butadiene.

5. A method according to claim 1, wherein 1,3-diene is chloroprene.

6. A method according to claim 1, wherein 1,3-diene is cyclopentadiene.

References Cited

UNITED STATES PATENTS 3,067,244  12/1962  Robinson et al. _____ 260—514

OTHER REFERENCES

"Acceleration of the Diels-Alder Reaction by Aluminum Chloride," Yates et al., Journal of the American Chemical Society, 82, pp. 4436–4437.

CHARLES B. PARKER, *Primary Examiner.*

JOSEPH P. BRUST, *Examiner.*

S. T. LAWRENCE III, *Assistant Examiner.*